(12) United States Patent
Oya

(10) Patent No.: US 8,451,552 B2
(45) Date of Patent: May 28, 2013

(54) LENS DRIVING DEVICE

(75) Inventor: Takahiro Oya, Yokohama (JP)

(73) Assignee: Canon Kabushiki Kaisha (JP)

(*) Notice: Subject to any disclaimer, the term of this patent is extended or adjusted under 35 U.S.C. 154(b) by 157 days.

(21) Appl. No.: 12/355,099

(22) Filed: Jan. 16, 2009

(65) Prior Publication Data

US 2009/0185299 A1 Jul. 23, 2009

(30) Foreign Application Priority Data

Jan. 17, 2008 (JP) ................................ 2008-008050

(51) Int. Cl.
*G02B 7/02* (2006.01)

(52) U.S. Cl.
USPC ............ 359/823; 359/819; 359/822; 359/824

(58) Field of Classification Search .................. 359/819, 359/822–824, 829
See application file for complete search history.

(56) References Cited

U.S. PATENT DOCUMENTS

| 7,479,721 | B2 | 1/2009 | Kobayashi | |
| 2006/0072220 | A1* | 4/2006 | Hase ............................ | 359/823 |
| 2008/0088955 | A1* | 4/2008 | Ishimasa et al. ............. | 359/819 |

FOREIGN PATENT DOCUMENTS

| CN | 1267949 A | 9/2000 |
| JP | 4-35112 U | 3/1992 |
| JP | 7-27287 U | 5/1995 |
| JP | 11-018404 A | 1/1999 |
| JP | 11018404 A * | 1/1999 |
| JP | 2003047228 A * | 2/2003 |
| JP | 2006-042581 A | 2/2006 |
| JP | 2006-106342 A | 4/2006 |
| JP | 2007-219147 A | 8/2007 |
| JP | 2007-287281 A | 11/2007 |

OTHER PUBLICATIONS

Japanese Office Action for corresponding JP 2008-008050, dated Oct. 4, 2011.
Japanese Office Action issued in Japanese counterpart Appln No. 2008-008050, dated Oct. 4, 2011. English translation is provided.
Notification of First Office Action issued in corresponding Chinese Patent Application No. 200910001589.6 dated Jun. 1, 2010.
Japanese Office Action for JP 2008-008050, mail date May 15, 2012.

* cited by examiner

*Primary Examiner* — Mahidere Sahle
(74) *Attorney, Agent, or Firm* — Rossi, Kimms & McDowell LLP

(57) ABSTRACT

A lens driving device which can stably support a lead screw, and furthermore, can reduce driving load while maintaining a centering function for stabilizing a lens stop position. The lens driving device comprises a lens for holding member holding a photographic lens, a lead screw for moving the lens holding member forward and backward in a photographic optical axis direction, and a first support member and a second support member for rotationally supporting the lead screw. The second support member has a support concave portion having an apex for supporting the lead screw, and the lead screw has a support portion that is in point contact with the support concave portion having the apex.

4 Claims, 7 Drawing Sheets

PRIOR ART

PRIOR ART

LENS DRIVING DEVICE

BACKGROUND OF THE INVENTION

1. Field of the Invention

The present invention relates to a lens driving device which moves a zoom lens group or a focus lens group forward and backward in a photographic optical axis direction, and more particularly, to a lens driving device which transmits a driving force via a lead screw.

2. Description of the Related Art

Conventionally, a lens driving device includes a lens driving device which transmits the rotational force of a stepping motor to a lead screw via a gear.

The lens driving device which transmits the rotational force of a stepping motor to a lead screw via a gear will be described with reference to FIG. 11.

FIG. 11 is a cross-sectional view of essential parts of a first conventional lens driving device.

As shown in FIG. 11, a lead screw 107 has a fitting portion 107b formed at a base 107c of a male screw 107a positioned at one end side of the lead screw 107, and the fitting portion 107b is rotatably supported by only one position of a support hole 101a formed in a CCD base plate 101.

A holding portion 107d having a spherical surface (sphere R) shape is provided at a position spaced apart from the base 107c of the lead screw 107. The holding portion 107d abuts on a gear cover 108. The lead screw 107 is thereby held on the CCD base plate 101.

That is, the lead screw 107 is supported at only one end on the CCD base plate 101 with the top end portion of the lead screw 107 on the male screw 107a side not being supported. A gear 106 is fixed between the fitting portion 107b and the holding portion 107d of the lead screw 107, to thereby transmit the rotational force of a stepping motor to the lead screw 107.

FIG. 12 is a cross-sectional view of essential parts of a second conventional lens driving device (see Japanese Laid-Open Patent Publication (Kokai) No. 2007-219147). The same components as those in the lens driving device of FIG. 11 are designated by the same reference numerals.

In FIG. 12, a conical support portion 207d is provided at a position spaced apart from the base 107c of the lead screw 107. The conical support portion 207d is fittingly supported in a support hole 208a formed in a gear cover 208 in a rotatable manner. The lead screw 107 is supported between the CCD base plate 101 and the gear cover 208.

At this time, the lead screw 107 and the gear cover 208 are in a line contact state in which the conical support portion 207d of the lead screw 107 and a hole end portion (edge) of the support hole 208a of the gear cover 208 abut on each other. Through the abutment, the lead screw 107 is held between the CCD base plate 101 and the gear cover 208.

Because of the above configuration, the lead screw 107 can be supported in a stable state. The top end of the lead screw 107 is prevented from swinging. Also, a change in operating load due to the tilting of the lead screw 107 is reduced.

In the first conventional lens driving device (FIG. 11), the fitting portion 107b of the lead screw 107 is supported by only one position of the support hole 101a of the CCD base plate 101. Thus, when the lead screw 107 is rotated, the top end of the male screw 107a of the lead screw 107 swings due to a fitting play generated between the fitting portion 107b and the support hole 101a, thus a lens stop position cannot be stabilized.

In the second conventional lens driving device (FIG. 12), the problem in the former one is improved. That is, by providing the lead screw 107 with the conical support portion 207d and fittingly supporting the conical support portion 207d in the support hole 208a formed in the gear cover 208 in a rotatable manner, a centering function is provided, thereby stabilizing the lens stop position.

In the second conventional lens driving device, the conical support portion 207d of the lead screw 107 is supported in the line contact state with the support hole 208a of the gear cover 208. Thus, there is such a problem that driving load is increased relative to the first conventional lens driving device having the spherical surface (sphere R) shape holding portion 107d abuts on the gear cover 108 and is in point contact therewith.

SUMMARY OF THE INVENTION

The present invention provides a lens driving device which can stably support a lead screw, and furthermore, can reduce driving load while maintaining a centering function for stabilizing a lens stop position.

In an aspect of the present invention, there is provided a lens driving device comprising a lens holding member adapted to hold a photographic lens, a lead screw adapted to move the lens holding member forward and backward in a photographic optical axis direction, and a first support member and a second support member adapted to rotationally support the lead screw, wherein the second support member has a support concave portion having an apex for supporting the lead screw, and the lead screw has a support portion that is in point contact with the support concave portion having the apex.

According to the lens driving device of the present invention, the lead screw can be stably supported, and furthermore, the driving load can be reduced while maintaining the centering function for stabilizing the lens stop position.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
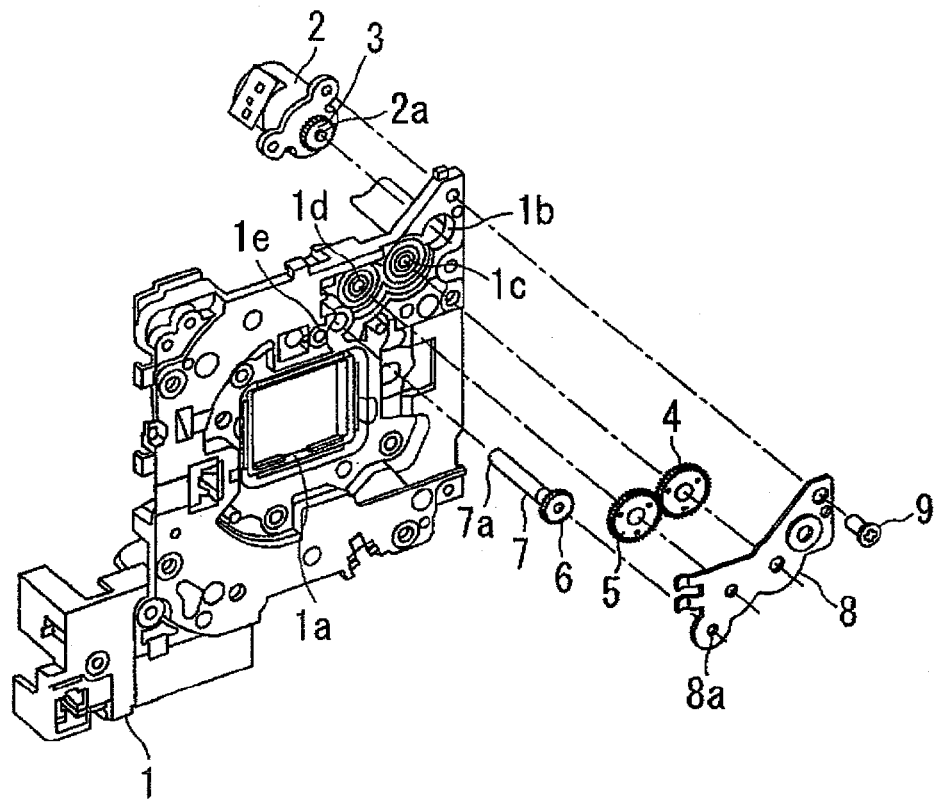
FIG. 1 is an exploded perspective view of a lens driving portion of a lens driving device according to a first embodiment of the present invention.
Figure 2:
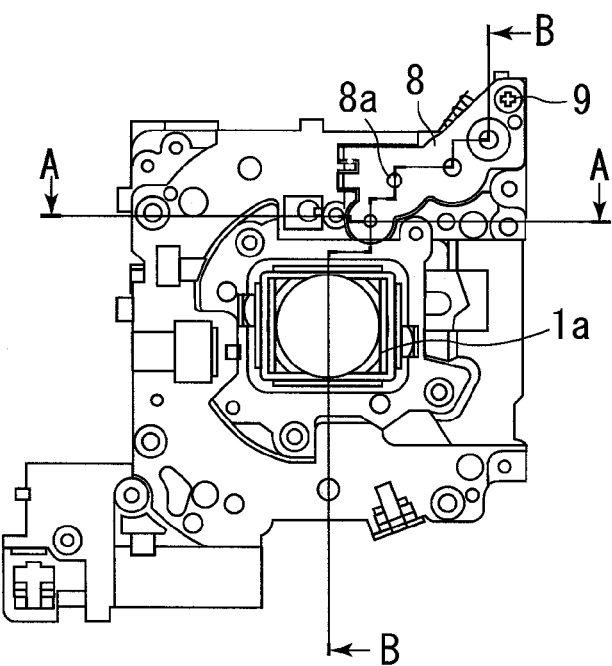
FIG. 2 is a rear view of the lens driving portion of the lens driving device of FIG. 1.
Figure 3:
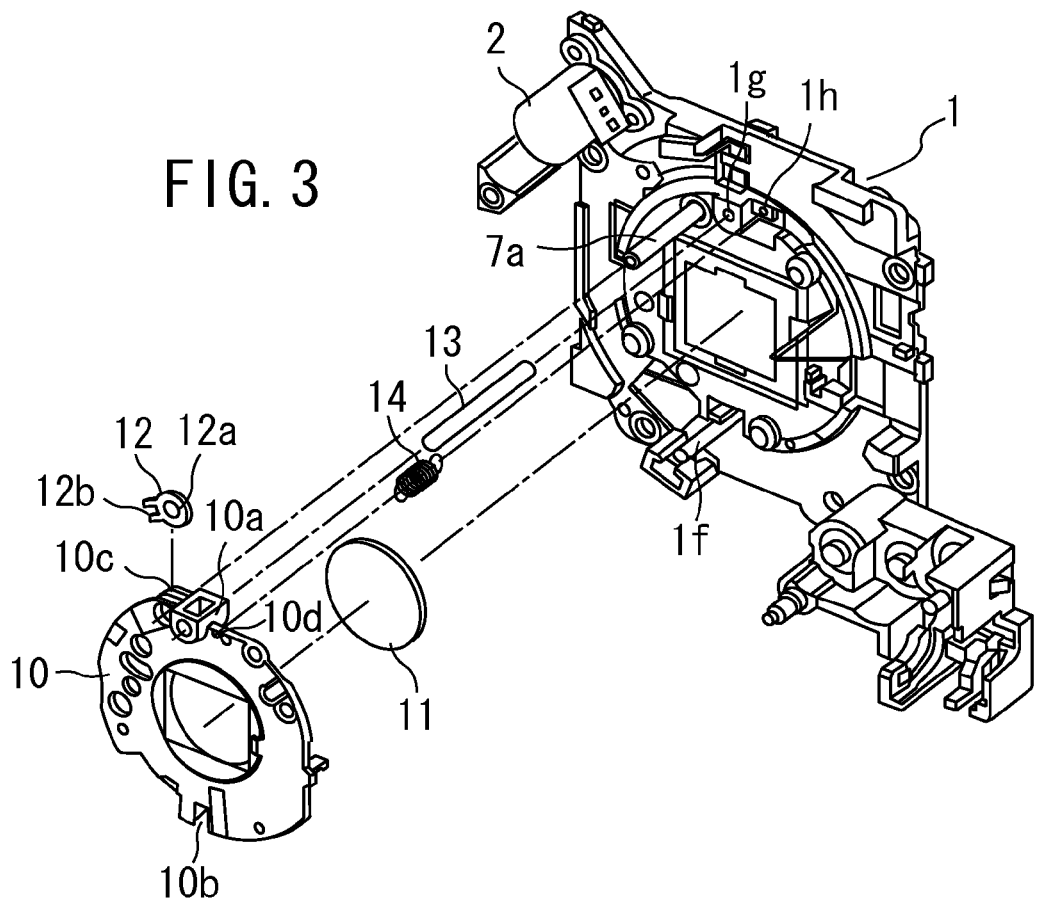
FIG. 3 is an exploded perspective view of a lens holding member of the lens driving device of FIG. 1.
Figure 4:
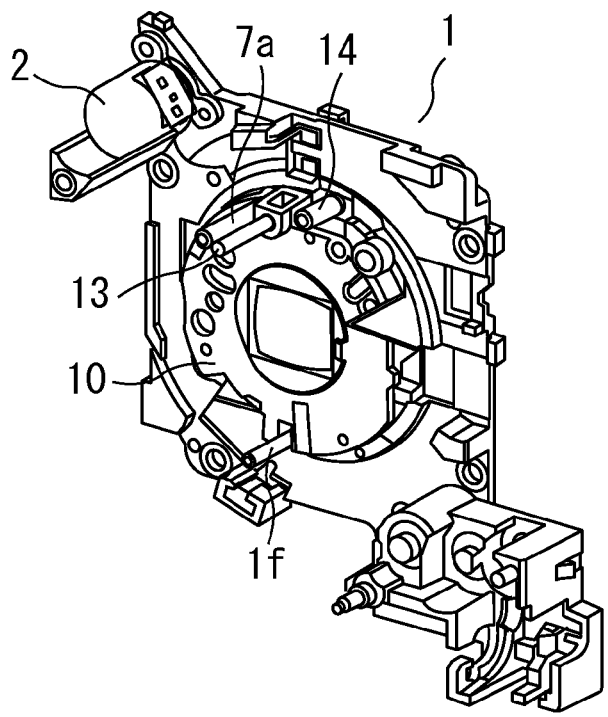
FIG. 4 is a perspective view of the lens holding member of FIG. 3.
Figure 5:
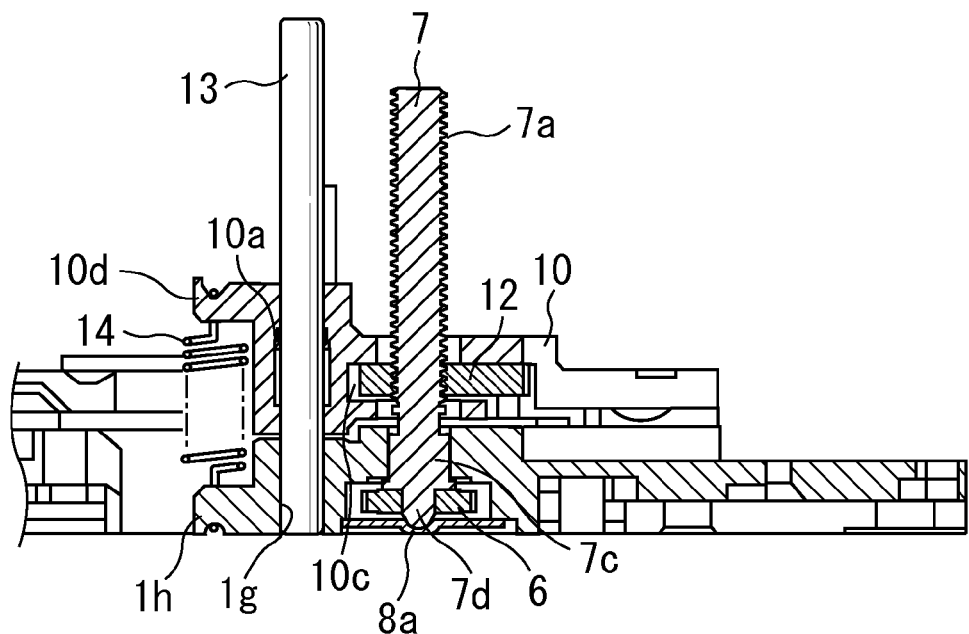
FIG. 5 is a sectional view taken along line A-A shown in FIG. 2.
Figure 6:
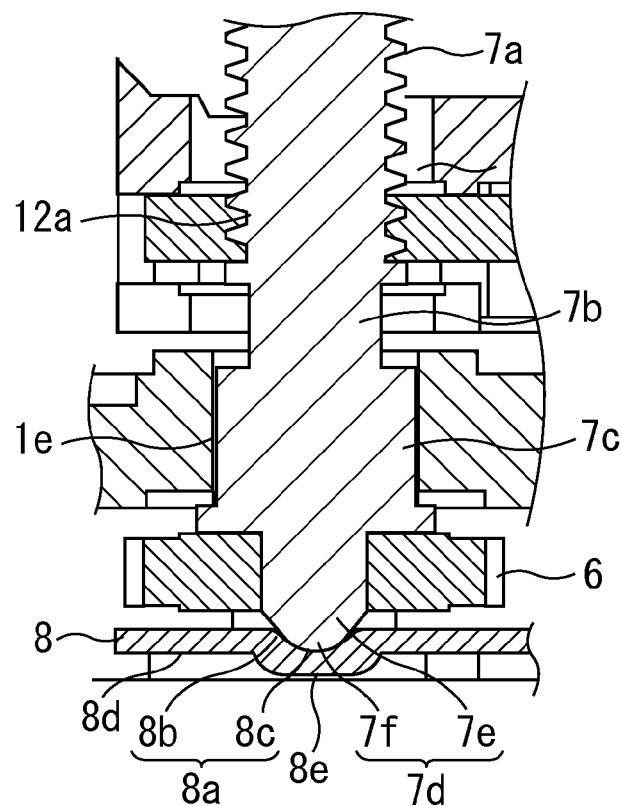
FIG. 6 is an enlarged view of essential parts of FIG. 5.
Figure 7:
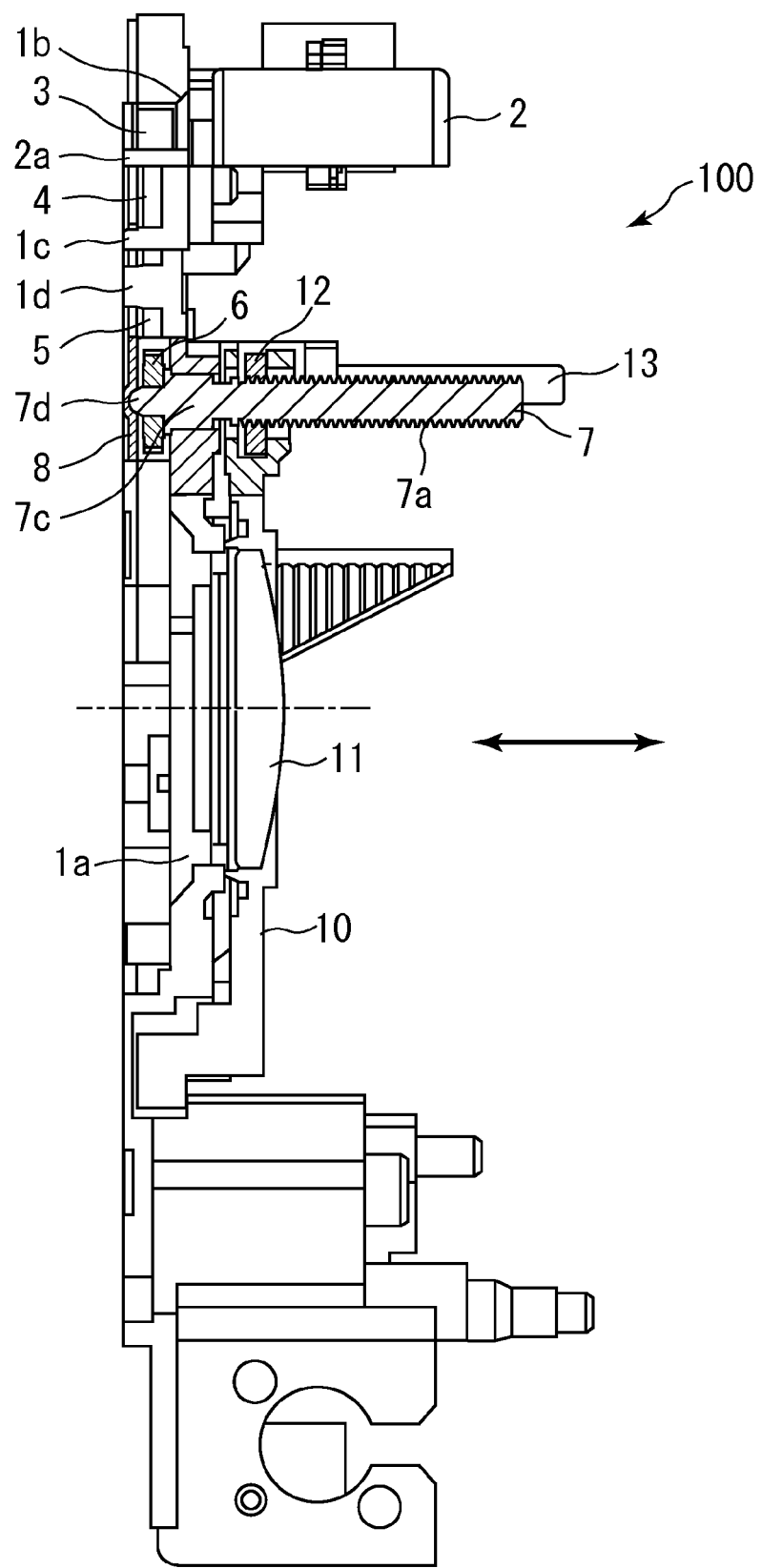
FIG. 7 is a sectional view taken along line B-B shown in FIG. 2.
Figure 8:
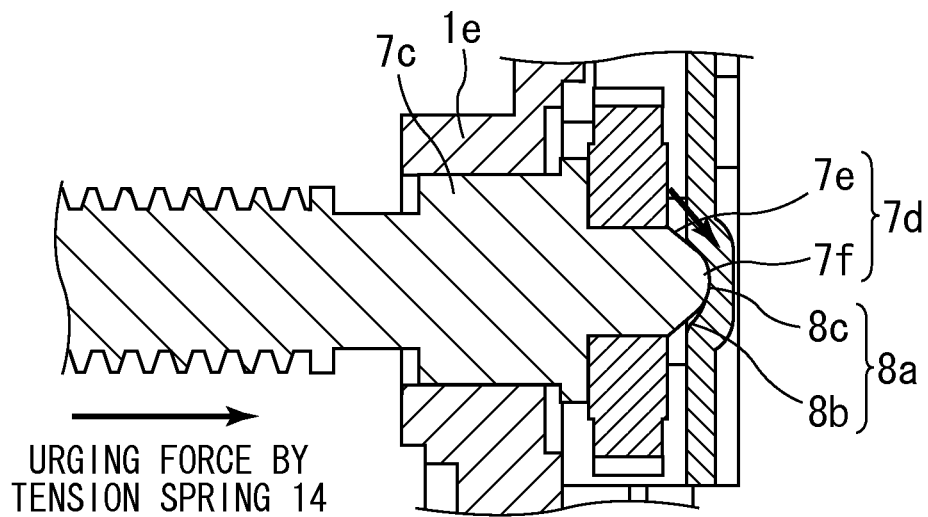
FIG. 8 is an enlarged view of essential parts of FIG. 5 used for explaining a case in which a lead screw swings due to a fitting play.

Here, FIG. 1 is an exploded perspective view of a lens driving portion of a lens driving device according to a first embodiment of the present invention. FIG. 2 is a rear view of the lens driving portion of the lens driving device of FIG. 1. FIG. 3 is an exploded perspective view of a lens holding member of the lens driving device of FIG. 1. FIG. 4 is a perspective view of the lens holding member of the lens driving device of FIG. 3. FIG. 5 is a sectional view taken along line A-A shown in FIG. 2. FIG. 6 is an enlarged view of essential parts of FIG. 5. FIG. 7 is a sectional view taken along line B-B shown in FIG. 2. FIG. 8 is an enlarged view of essential parts of FIG. 5 used for explaining a case in which a lead screw swings due to a fitting play.

The configuration of a lens driving portion of a driving device 100 (FIG. 7) according to the first embodiment of the present invention will be described with reference to FIGS. 1, 2, 5 and 6.

The lens driving portion shown in FIGS. 1 and 2 includes a CCD base plate 1, a stepping motor 2, reduction gears 4 and 5, a lead screw 7, and a gear cover 8. The CCD base plate 1 and the gear cover 8 rotationally support the lead screw 7.

An image pickup element chamber 1a for accommodating an unillustrated optical low-pass filter and image pickup element is formed in the center portion of a photographic optical axis in the CCD base plate 1, to thereby support an unillustrated lens barrel unit.

The stepping motor 2 is located opposite to the reduction gears 4 and 5 via the CCD base plate 1, and is disposed in parallel with the photographic optical axis. The stepping motor 2 is also fixed to the CCD base plate 1 via the gear cover 8 by a fixing screw 9.

A pinion gear 3 is pressed into the top end of a rotating shaft 2a of the stepping motor 2, and passes through a hole 1b formed in the CCD base plate 1 to mesh with the reduction gear 4. The rotational force of the stepping motor 2 is thereby transmitted to the reduction gears 4 and 5.

The reduction gears 4 and 5 are respectively fittingly supported by support shafts 1c and 1d formed on the CCD base plate 1 in a rotatable manner, and are held on the CCD base plate 1 by the gear cover 8. A male screw 7a is formed on the lead screw 7. The lead screw 7 is disposed in parallel with the photographic optical axis so as to extend in the photographic optical axis direction.

Next, a method of supporting the lead screw 7 will be described with reference to FIGS. 5 and 6.

First, a support portion 7c formed at the base of the male screw 7a of the lead screw 7 is fittingly supported in a support hole 1e formed in the CCD base plate 1 in a rotatable manner. Furthermore, a support portion 7d formed at a position spaced apart from the base of the lead screw 7 is rotatably supported in a support concave portion 8a formed in the gear cover 8. The lead screw 7 is thereby supported between the CCD base plate 1 and the gear cover B.

Specifically, the support portion 7d formed on the lower end of the lead screw 7 has a tip convex shape composed of a conical portion 7e and a spherical surface (sphere R) shape portion (hereinafter simply referred to as "spherical portion") 7f continuing from the tangent line of the cone as shown in FIG. 6. Also, specifically, the support concave portion 8a of the gear cover 8 has a concave shape composed of a conical portion 8b with a more obtuse angle than the conical portion 7e of the lead screw 7 and a spherical portion 8c continuing from the tangent line of the cone, and having an apex on the bottom portion. The spherical portion 7f has a smaller diameter than the spherical portion 8c.

Moreover, a radius R7f of the spherical portion 7f of the lead screw 7 has a relationship of R7f<R8c with respect to a radius R8c of the spherical portion 8c of the gear cover 8. At this time, the lead screw 7 and the gear cover 8 are in a point contact state in which the tip spherical portion 7f of the support portion 7d of the lead screw 7 and the spherical portion 8c of the support concave portion 8a of the gear cover 8 abut on each other at the apex. Through the abutment, the lead screw 7 is held between the CCD base plate 1 and the gear cover 8.

Also, as shown in FIG. 7, a gear 6 meshing with the reduction gear 5 is pressed into the lead screw 7 with the gear 6 being held between the support portion 7c and the support portion 7d, whereby the gear 6 is rotated integrally with the lead screw 7. That is, the rotational force of the stepping motor 2 is transmitted from the pinion gear 3 to the reduction gear 4, the reduction gear 5, and the gear 6 in sequence, to thereby rotate the lead screw 7.

Returning to FIG. 1, the gear cover 8 is fixed to the CCD base plate 1 by the fixing screw 9. The reduction gears 4 and 5 are thereby held on the CCD base plate 1. Also, the lead screw 7 is thereby held and supported on the CCD base plate 1.

Next, the configuration of a support structure for a lens holding member will be described with reference to FIGS. 3 to 5.

In FIGS. 3 and 4, a lens holding member 10 includes a photographic lens 11, a nut 12, a guide bar 13, and a tension spring 14.

The lens holding member 10 holds the photographic lens 11. The guide bar 13 is slidably fitted into a guide hole 10a, and a rotation stopper shaft if formed on the CCD base plate 1 is slidably fitted into a rotation stopper hole 10b, so that the lens holding member 10 is supported on the CCD base plate L.

A female screw 12a to threadedly engage with the male screw 7a of the lead screw 7 is formed on the nut 12. The nut 12 is accommodated in an accommodation chamber 10c formed in the lens holding member 10. In accordance with the rotation of the lead screw 7, the nut 12 is moved forward and backward together with the lens holding member 10 in the photographic optical axis direction along the lead of the male screw 7a of the lead screw 7.

At this time, an unillustrated rotation stopper shaft formed on the lens holding member 10 is fitted into a long hole portion 12b formed in the nut 12, so that the rotation of the nut 12 is suppressed. The guide bar 13 is disposed in the vicinity of the lead screw 7 and in parallel with the photographic optical axis.

Also, as shown in FIG. 5, the guide bar 13 is supported at only one end on the CCD base plate 1 with the top end of the guide bar 13 on one end side not being supported and only the other end side being pressed and supported in a fixing hole 1g of the CCD base plate 1.

The tension spring 14 is disposed in the vicinity of the guide bar 13. One end thereof is hooked on a hook 1h formed on the CCD base plate 1 and the other end thereof is hooked on a hook 10*d* formed in the vicinity of the guide hole 10*a* of the lens holding member 10.

Accordingly, a screw play between the male screw 7*a* of the lead screw 7 and the female screw 12*a* of the nut 12 is absorbed, and the lens holding member 10 is urged in a retraction direction. By providing the tension spring 14, the support portion 7*d* of the lead screw 7 reliably abuts on the support concave portion 8*a* of the gear cover 8 even when the lead screw 7 is rotated to move the nut 12 and the lens holding member 10 forward and backward in the optical axis direction.

Next, the operation of the lens driving device 100 will be described with reference to FIG. 7.

When the stepping motor 2 is rotated, the rotational force is transmitted to the gear 6 via the pinion gear 3 and the reduction gears 4 and 5. When the gear 6 to which the rotational force is transmitted is rotated, the gear 6 and the lead screw 7 are rotated in the same direction.

When the lead screw 7 is rotated, the nut 12 is moved forward and backward in the photographic optical axis direction shown by an arrow in FIG. 7 along the lead of the male screw 7*a* of the lead screw 7 since the rotation thereof is suppressed by the unillustrated rotation stopper shaft of the lens holding member 10.

Since the nut 12 is accommodated in the accommodation chamber 10*c* of the lens holding member 10 (FIG. 3), the motion of the nut 12 is directly transmitted to the lens holding member 10. Accordingly, the lens holding member 10 is moved forward and backward in the photographic optical axis direction along the guide bar 13.

Next, a case in which the lead screw 7 swings due to a fitting play between the support portion 7*c* of the lead screw 7 and the support hole 1*e* of the CCD base plate 1 will be described with reference to FIG. 8.

In the present invention, the support portion 7*d* of the lead screw 7 is brought into point contact with the gear cover 8. Thus, the lead screw 7 may swing as shown in FIG. 8 at the time of incorporating the gear cover 8, for example, due to the fitting play between the support portion 7*c* and the support hole 1*e* of the CCD base plate 1.

The conical portion 8*b* of the support concave portion 8*a* formed in the gear cover 8 has a more obtuse angle than the conical portion 7*e* provided in the support portion 7*d* of the lead screw 7.

Therefore, in such a case, the tip spherical portion 7*f* of the support portion 7*d* of the lead screw 7 is always in point contact with any of the inclined planes of the conical portion 8*b* of the support concave portion 8*a* of the gear cover 8 and the spherical portion 8*c*.

That is, the support portion 7*d* maintains the point contact state even when the lead screw 7 swings, so that driving load is not increased. Also, since the lead screw 7 threadedly engaging with the nut 12 is always urged to the gear cover 8 side by the tension spring 14, the spherical portion 7*f* of the lead screw 7 is drawn to the apex on the bottom portion of the support concave portion 8*a* of the gear cover 8 along the inclined plane.

That is, even when the lead screw 7 swings, the support portion 7*d* of the lead screw 7 is drawn to the apex on the bottom portion of the support concave portion 8*a* of the gear cover 8 due to a centering function. Therefore, the lead screw 7 can be stably supported, and a lens stop position can be stabilized.

As described above, in the configuration of the present embodiment, the support portion 7*d* of the lead screw 7 has the tip convex shape including the conical portion 7*e* and the spherical portion 7*f* continuing from the tangent line of the cone. Also, the support concave portion 8*a* of the gear cover 8 has the concave shape including the conical portion 8*b* with a more obtuse angle than the conical portion 7*e* of the lead screw 7 and the spherical portion 8*c* continuing from the tangent line of the cone, and having the apex on the bottom portion.

Furthermore, the radius R7*f* of the spherical portion 7*f* of the lead screw 7 has the relationship of R7*f*<R8*c* with respect to the radius R8*c* of the spherical portion 8*c* of the gear cover 8, so that the lead screw 7 can be stably supported. Moreover, while the centering function for stabilizing the lens stop position is maintained, the driving load can be reduced.

The conical portion 7*e* of the lead screw 7 and the conical portion 8*b* of the gear cover 8 are not limited to the conical shape so long as the centering function in the present invention is obtained. So long as the support portion 7*d* has the tip convex shape and the support concave portion 8*a* has the concave shape having the apex, for example, a parabolic shape may be employed without any problem.

Figure 9:
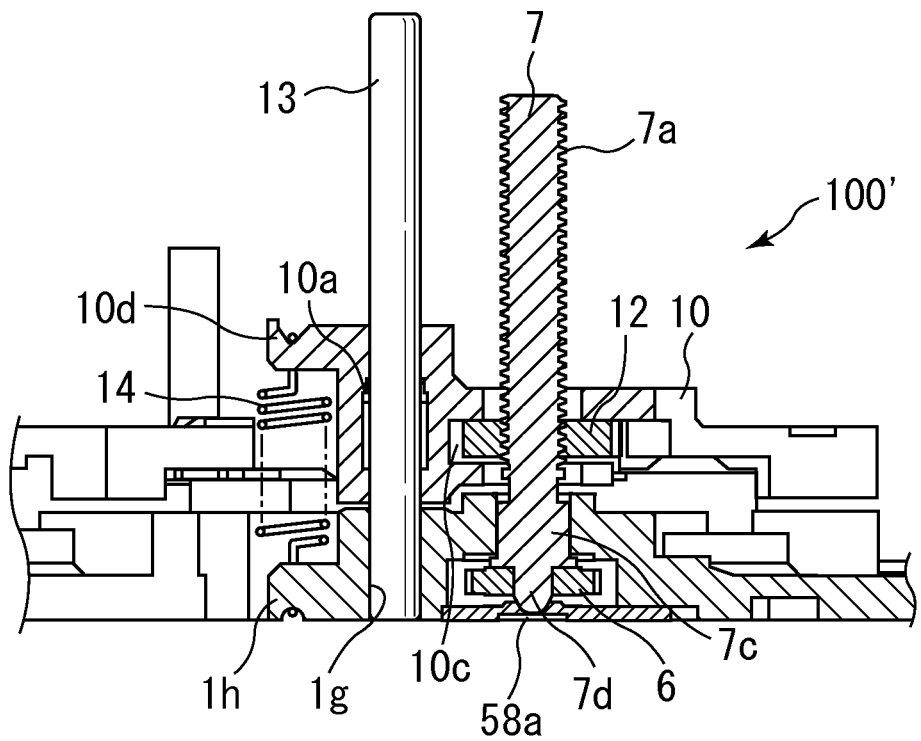
FIG. 9 is a partial cross-sectional view of a lens driving device according to a second embodiment of the present invention.
Figure 10:
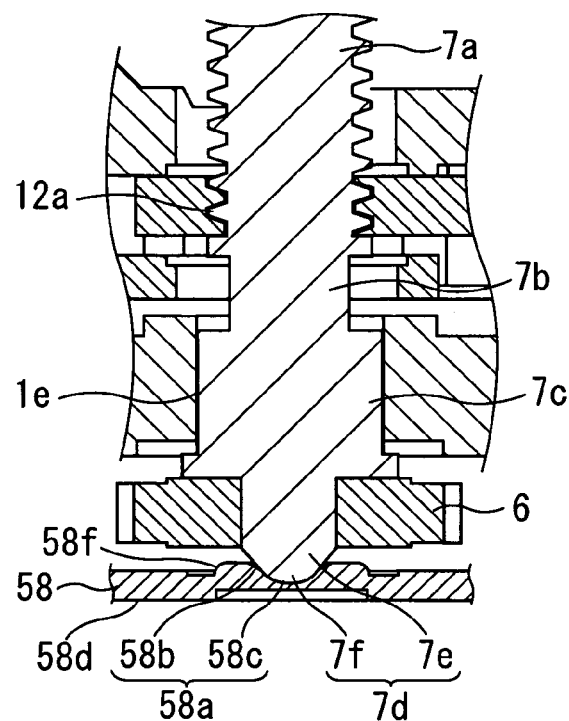
FIG. 10 is an enlarged view of FIG. 9.
Figure 11:
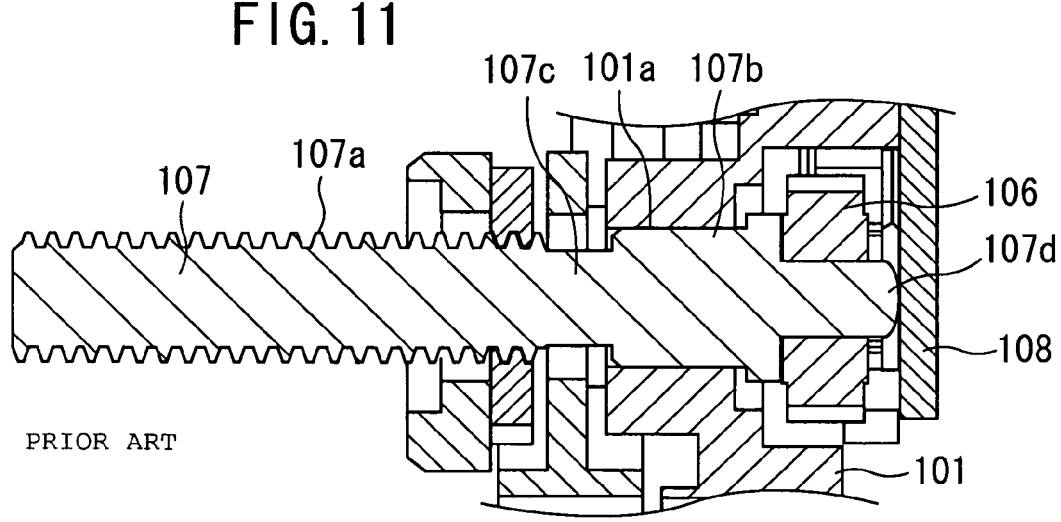
FIG. 11 is a cross-sectional view of essential parts of a first conventional lens driving device.
Figure 12:
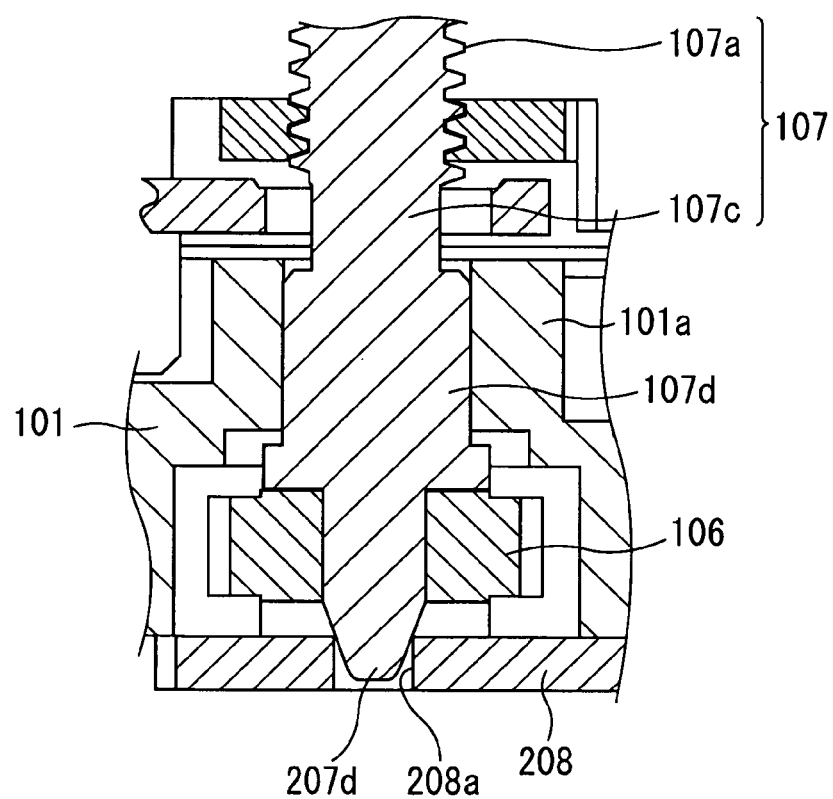
FIG. 12 is a cross-sectional view of essential parts of a second conventional lens driving device.

Next, a second embodiment of the present invention will be described with reference to FIGS. 9 and 10. To be more specific, FIG. 9 is a partial cross-sectional view (a view corresponding to FIG. 5) of a lens driving device 100' according to the second embodiment of the present invention, and FIG. 10 is an enlarged view of FIG. 9. In FIGS. 9 and 10, the same portions as those of the first embodiment are designated by the same reference numerals.

In a case where a collapsed length of an unillustrated lens barrel unit is to be reduced, the gear cover 8 is generally constructed from a sheet metal used as a metallic component. In the first embodiment, a back surface 8*e* of the support concave portion 8*a* projects from a back surface 8*d* of the gear cover 8 located on the back side of the lens driving device 100 for forming the support concave portion 8*a* of the gear cover 8 as shown in FIG. 6, which is not suitable for reducing the collapsed length of the lens barrel unit.

In the second embodiment, a bulge portion 58*f* is provided on the lead screw 7 side of a gear cover 58 as shown in FIG. 10. The bulge portion 58*f* is formed around a support concave portion 58*a* (a conical portion 58*b*, a spherical portion 58*c*). By causing the bulge portion 58*f* to bulge toward the lens driving device side, an overlapping amount of the support portion 7*d* of the lead screw 7 and the support concave portion 55*a* is ensured in an amount equivalent to that of the first embodiment, and a back surface 58*d* of the gear cover 58 does not have a convex shape.

Even when the support portion 7*d*, the support concave portion 58*a* and the bulge portion 58*f* are shaped as in the second embodiment, the second embodiment achieves the same advantages as those described in the first embodiment. Furthermore, the collapsed length of the lens barrel unit can be further reduced.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2008-008050 filed Jan. 17, 2008, which is hereby incorporated by reference herein in its entirety.

What is claimed is:
1. A lens driving device comprising:
   a holding member adapted to hold an image pickup element;

a lens holding member adapted to hold a photographic lens;

a lead screw adapted to move said lens holding member forward and backward in a photographic optical axis direction; and a first support member and a second support member adapted to rotationally support said lead screw, wherein said first support member is integrally formed in said holding member, one end side of said lead screw being supported by the first support member and the second support member, and other end side of said lead screw being unsupported, said second support member has a support concave portion having an apex for supporting said lead screw, and said lead screw has a support portion that is in point contact with the support concave portion having the apex, wherein the support concave portion having the apex and the support portion respectively have spherical portions in the vicinity of the portions in point contact with each other, and the spherical portion formed in the support portion has a smaller diameter than the spherical portion formed in the support concave portion having the apex, and wherein the support portion further has a first conical portion formed on an end of said lead screw, wherein the spherical portion continues from a tangent line of the first conical portion, and the support concave portion having the apex further has a second conical portion with a more obtuse angle than the first conical portion formed in the support portion, wherein the spherical portion continues from a tangent line of the second conical portion.

2. The lens driving device according to claim 1, wherein said second support member has a bulge portion that bulges toward the lead screw side, and the support concave portion having the apex is formed in the bulge portion.

3. A lens driving device according to claim 1, wherein said second support member supports said lead screw in a direction along the longitudinal axis of the lead screw.

4. A lens driving device according to claim 1, wherein the apex of said second support member is aligned with the longitudinal axis of the lead screw.

\* \* \* \* \*